(12) United States Patent
Oliveira

(10) Patent No.: US 9,231,960 B2
(45) Date of Patent: Jan. 5, 2016

(54) METHODS AND SYSTEMS FOR SERVICE DELIVERY

(75) Inventor: Victor Oliveira, Aveiro (PT)

(73) Assignee: Alcatel Lucent, Boulogne-Billancourt (FR)

( * ) Notice: Subject to any disclaimer, the term of this patent is extended or adjusted under 35 U.S.C. 154(b) by 29 days.

(21) Appl. No.: 13/822,345

(22) PCT Filed: Sep. 9, 2011

(86) PCT No.: PCT/EP2011/065647
§ 371 (c)(1),
(2), (4) Date: Mar. 12, 2013

(87) PCT Pub. No.: WO2012/034943
PCT Pub. Date: Mar. 22, 2012

(65) Prior Publication Data
US 2013/0174251 A1    Jul. 4, 2013

(30) Foreign Application Priority Data
Sep. 15, 2010    (EP) .................................... 10305988

(51) Int. Cl.
*H04L 29/06*    (2006.01)
*G06F 21/31*    (2013.01)
*H04L 29/08*    (2006.01)

(52) U.S. Cl.
CPC .............. *H04L 63/107* (2013.01); *G06F 21/31* (2013.01); *H04L 67/18* (2013.01); *H04L 67/306* (2013.01); *H04L 67/36* (2013.01)

(58) Field of Classification Search
CPC ........ H04L 67/18; H04L 67/306; G06F 21/32
See application file for complete search history.

(56) References Cited

U.S. PATENT DOCUMENTS

| 2003/0028621 A1 | 2/2003 | Furlong et al. |
| 2003/0069964 A1 | 4/2003 | Shteyn et al. |

(Continued)

FOREIGN PATENT DOCUMENTS

| CN | 1792074 A | 6/2006 |
| CN | 101005369 A | 7/2007 |

(Continued)

OTHER PUBLICATIONS

PCT Pat. App. No. PCT/EP2011/065647, Written Opinion of the International Searching Authority, mailed Jun. 10, 2011, 6 pp.

(Continued)

*Primary Examiner* — Robert Leung
(74) *Attorney, Agent, or Firm* — Fay Sharpe LLP

(57) ABSTRACT

A system for providing a service comprising: —a service provisioning control means adapted for identifying a user, and for providing services to said user; the system further comprising: —a location information retrieval means adapted for receiving location information of user; and for identifying a local service delivery system; —an available service pack information retrieval means adapted for retrieving available service pack information corresponding to local service delivery system, the available service pack information comprising information about the set of possible services which can be delivered to user by local service delivery system; and wherein service provisioning control means is adapted for —selecting a subset of services of available service pack information corresponding, based on at least a set of priority rules; and for —providing at least one of subset of services to the user; and associated methods and devices.

20 Claims, 2 Drawing Sheets

(56) References Cited

U.S. PATENT DOCUMENTS

| | | | |
|---|---|---|---|
| 2003/0151621 A1 | 8/2003 | McEvilly et al. | |
| 2005/0114448 A1 | 5/2005 | Skomra | |
| 2007/0006098 A1* | 1/2007 | Krumm et al. | 715/825 |
| 2007/0050184 A1* | 3/2007 | Drucker et al. | 704/3 |
| 2008/0219256 A1* | 9/2008 | Tanaka | 370/389 |
| 2009/0005076 A1* | 1/2009 | Forstall et al. | 455/456.2 |
| 2009/0070533 A1 | 3/2009 | Elazary et al. | |
| 2009/0260005 A1 | 10/2009 | Nakagawa et al. | |
| 2011/0145323 A1* | 6/2011 | Kahn et al. | 709/203 |

FOREIGN PATENT DOCUMENTS

| | | |
|---|---|---|
| EP | 1 176 506 A1 | 1/2002 |
| JP | 2000-3795 A | 1/2000 |
| JP | 2003-111157 A | 4/2003 |
| JP | 2004-537879 A | 12/2004 |
| JP | 2006-11956 A | 1/2006 |
| JP | 2006-67417 A | 3/2006 |
| JP | 2009-252075 A | 10/2009 |

OTHER PUBLICATIONS

EP Pat. App. No. 10305988.7, Extended European Search Report, mailed Jan. 7, 2011, 7 pp.

English Bibliography for Japanese Patent Application Publication No. JP2000003795A, published Jan. 7, 2000, printed from Thomson Innovation on Apr. 15, 2014, 3 pp.

English Bibliography for Japanese Patent Application Publication No. JP2003111157A, published Apr. 11, 2003, printed from Thomson Innovation on Apr. 15, 2014, 4 pp.

English Bibliography for Japanese Patent Application Publication No. JP2006067417A, published Mar. 9, 2006, printed from Thomson Innovation on Apr. 15, 2014, 4 pp.

International Search Report for PCT/EP2011/065647 dated Oct. 6, 2011.

English Bibliography for Chinese Patent Application Publication No. CN101005369A, published Jul. 25, 2007, printed from Thomson Innovation on Jan. 17, 2015, 3 pp.

English Bibliography for Chinese Patent Application Publication No. CN1792074A, published Jun. 21, 2006, printed from Thomson Innovation on Jan. 17, 2015, 4 pp.

English Bibliography for Japanese Patent Application Publication No. JP2004537879A, published Dec. 16, 2004, printed from Thomson Innovation on May 27, 2015, 3 pages.

English Bibliography for Japanese Patent Application Publication No. JP2006011956A, published Jan. 12, 2006, printed from Thomson Innovation on May 27, 2015, 3 pages.

English Bibliography for Japanese Patent Application Publication No. JP2009252075A, published Oct. 29, 2009, printed from Thomson Innovation on May 27, 2015, 4 pages.

* cited by examiner

METHODS AND SYSTEMS FOR SERVICE DELIVERY

TECHNICAL FIELD OF THE INVENTION

The present invention relates to the field of methods and systems for delivery of services to a user by means of a local service delivery system.

BACKGROUND OF THE INVENTION

Today, many types of service interfaces and service systems exist for providing services to a person. These service interfaces are adapted to be suitable for an "average" person. For instance many hotels have television screens in each room, on which service menus and service options are displayed and which can be selected by the user by means of a remote control.

One who regularly travels needs to get acquainted with the interface every time and needs to find his way in the menus. Moreover the command needs to be present, manipulated, needs batteries, may be complex in use, may not be visible under low illumination conditions, and cannot be used by blind people.

Some of these issues occur as well in home entertainment systems based on television.

There is a need for methods and systems which make the interaction with local service delivery systems more comfortable and straight forward.

SUMMARY OF THE INVENTION

It is an object of the present invention to provide methods, systems and devices which solve at least one of the above problems.

According to a first aspect of the present invention, a method is described for providing a service to a user by a local service delivery system under the control of a service provisioning control means, comprising performing by the service provisioning control means:
 Identifying the user by receiving an identification message comprising user identification information and by exchanging messages with a data storage means comprising a database which links user identification information with respective users;
 Controlling the provisioning of the services to the user; the method further comprising:
 receiving messages comprising user location information, and identifying the local service delivery system out of a set of local service delivery systems by exchanging messages with a storage means comprising a database which links location information with respective local service delivery systems;
 retrieving available service pack information corresponding to the local service delivery system by exchanging messages with a storage means comprising a database which links local service delivery systems with respective available service pack information, the available service pack information comprising information about the set of possible services which can be delivered to the user by the local service delivery system;
 selecting a subset of services of the available service pack information corresponding to the local service delivery system, based on at least a set of priority rules; and
 controlling the provisioning of at least one of the subset of services to the user.

According to preferred embodiments, the method further comprises retrieving user preference information for the user by exchanging messages with a data storage means comprising a database which links user preference information with respective users; wherein controlling the provisioning of the services to the user is based on at least the user preference information, and wherein selecting a subset of services of the available service pack information corresponding to the local service delivery system is based on at least the user preference information and a set of priority rules.

According to preferred embodiments, the method further comprises performing by the service provisioning control means:
 retrieving instruction information for the at least one of the subset of services by exchanging messages with a storage means comprising a database which links instruction information with respective local service delivery systems, the instruction information comprising information required to control the local service delivery system to perform the at least one of the subset of services;
 instructing the local service delivery system to perform the at least one of the subset of services by exchanging messages with a local service delivery control means, the local service delivery control means controlling the local service delivery system to provide the service to the user, based on the instruction information.

According to preferred embodiments, the method further comprises receiving messages comprising user commands and wherein selecting a subset of services of the available service pack information is further based on the user commands.

According to preferred embodiments, the local service delivery system comprises a display and/or sound system, and the service comprises the displaying and/or making available through audio of information relevant to the user.

The service can comprises displaying the information relevant to the user by the display system as a menu level of an on-screen-display menu of the local service delivery system by instructing the local service delivery system to navigate to the respective menu level.

The service can comprise displaying the information relevant to the user by the display system as an on-screen list, the on-screen list illustrating services available to the user and being arranged according to the set of priority rules.

The service can comprise providing via audio the information relevant to the user by the sound system as a spoken list, the spoken list announcing services available to the user and being arranged according to the set of priority rules.

The on-screen or spoken list can further be arranged based on user preference information.

According to a second aspect of the present invention, a system is described for providing a service to a user by a local service delivery system corresponding to a certain location of a set of disparate physical locations, comprising
 a service provisioning control means adapted for identifying the user, and for providing the services to the user; the system further comprising
 a location information retrieval means adapted for receiving or retrieving location information of the user; and for identifying the local service delivery system out of a set of local service delivery systems;
 an available service pack information retrieval means adapted for retrieving available service pack information corresponding to the local service delivery system, the available service pack information comprising information about the set of possible services which can be delivered to the user by the local service delivery system; and wherein the service provisioning control means is adapted for selecting a subset of services of the available service pack information corresponding, at least based on a set of priority rules; and for providing at least one of the subset of services to the user.

According to preferred embodiments, the SPCM is further adapted for retrieving user preference information for the user, for providing services to the user further at least based on the preference information (and optionally location information), and for selecting a subset of services of the available service pack information further based on the user preference information (and optionally location information).

According to preferred embodiments, the system further comprises a means for retrieving instruction information for the at least one of the subset of services, the instruction information comprising information required to control the local service delivery system to perform the at least one of the subset of services; and wherein the service provisioning control means is adapted for instructing the local service delivery system to perform the at least one of the subset of services, by using the instruction information, thereby providing the service to the user.

According to preferred embodiments, the system further comprises an interface means, that can be for instance a fixed or a mobile system of any type, at each of the disparate physical locations for receiving user commands and/or identification information from the user and for forwarding the user commands and/or identification information to the service provisioning control means, the service provisioning control means being further adapted for selecting a subset of services of the available service pack information further based on the user commands.

Preferably, each of the interface means is adapted for receiving user input information, e.g. commands and/or identification information, in the form of a voice signal of the user and for forwarding the user input information (e.g. commands and/or identification information) to the service provisioning control means, the service provisioning control means further being adapted for interpreting the information.

The interface means can be adapted for receiving user input information, e.g. commands and/or identification information, in the form of a voice signal and for forwarding the voice signal to the service provisioning control means, the service provisioning control means further being adapted for performing voice recognition of the voice signal and/or interpreting the information.

According to preferred embodiments, each local service delivery system comprises a display and/or sound system which is adapted for displaying and/or making available through audio of information relevant to the user.

According to a third aspect of the present invention, a service provisioning control means (SPCM) is disclosed for controlling the provisioning of a service to a user by a local service delivery system corresponding to a certain location of a set of disparate physical locations, wherein the SPCM is adapted for identifying the user, for retrieving user preference information for the user, and for providing the services to the user based on the preference information; the SPCM further comprising:

a location information retrieval means adapted for receiving or retrieving location information of the user; and for identifying the local service delivery system out of a set of local service delivery systems;

an available service pack information retrieval means adapted for retrieving available service pack information corresponding to the local service delivery system, the available service pack information comprising information about the set of possible services which can be delivered to the user by the local service delivery system; and wherein the service provisioning control means is adapted for selecting a subset of services of the available service pack information, based on the user preference information and a set of priority rules; and for controlling the provisioning of at least one of the subset of services to the user.

According to preferred embodiments, the SPCM further comprises:

a means for retrieving instruction information for the at least one of the subset of services, the instruction information comprising information required to control the local service delivery system to perform the at least one of the subset of services; and wherein the service provisioning control means is adapted for instructing the local service delivery system to perform the at least one of the subset of services, by using the instruction information, thereby providing the service to the user.

According to preferred embodiments, the SPCM is further adapted for selecting a subset of services of the available service pack information further based on user commands received from an interface means corresponding to the physical location of the user.

According to a fourth aspect of the present invention, a data storage means is disclosed comprising a database which links local service delivery systems corresponding to a set of disparate locations, with respective available service pack information, the available service pack information comprising information about the set of possible services which can be delivered to the user by the respective local service delivery system.

According to a fifth aspect of the present invention, a data storage means is disclosed comprising a database which links instruction information with respective local service delivery systems corresponding to a set of disparate locations, the instruction information comprising information required by a service provisioning control means according to any of the embodiments of the third aspect to control the respective local service delivery systems to perform services.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

Features which have been described above for the first aspect are also meant to be disclosed for the second aspect, and vice versa.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The description of aspects of the present invention is performed by means of particular embodiments and with reference to certain drawings but the invention is not limited thereto. Depicted figures are only schematic and should not be considered as limiting.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

For the purpose of the present description, the term "means" can be replaced by the term "apparatus".

Figure 1:
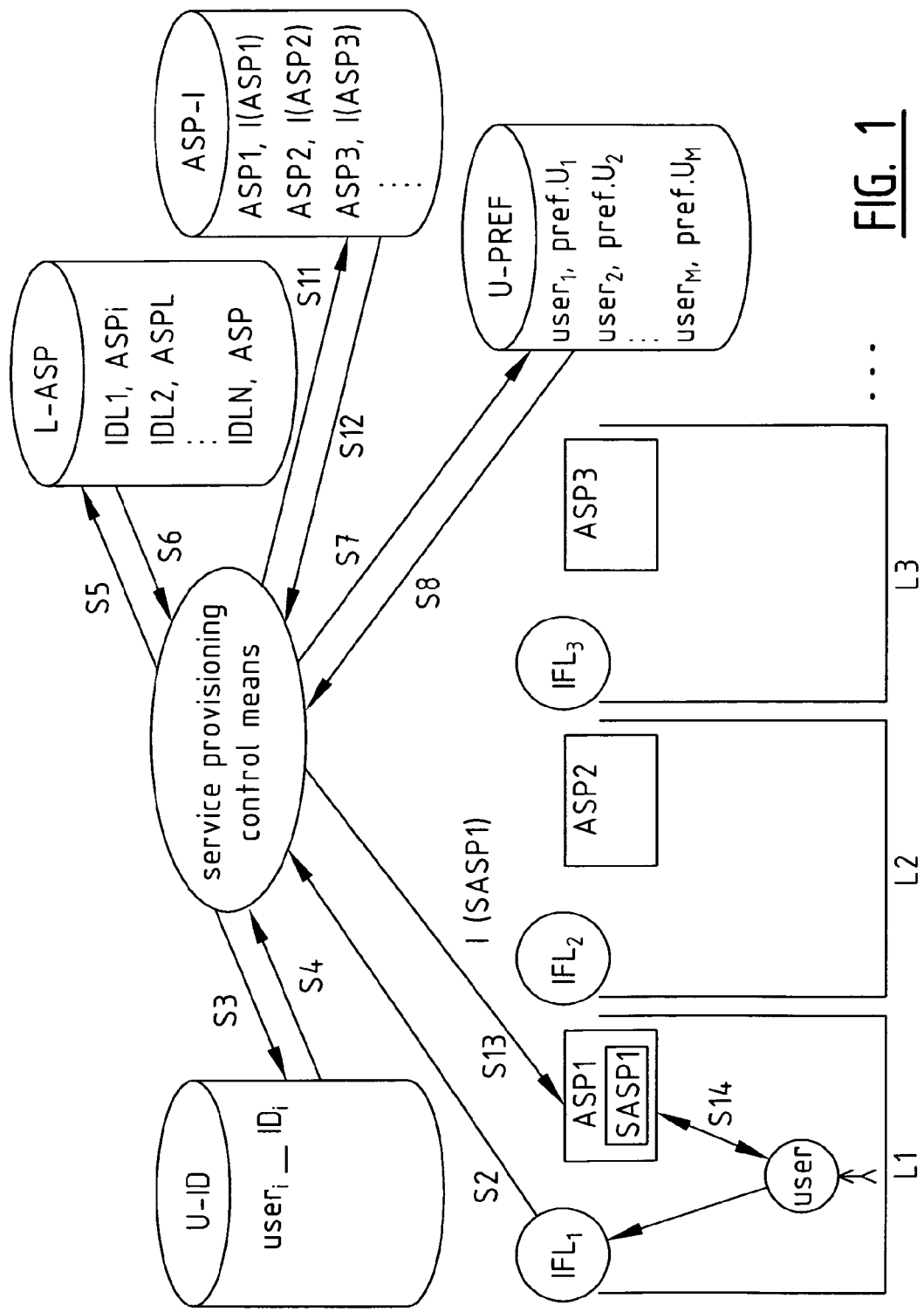
FIG. 1 illustrates an example of a system and method according to the present invention.
Figure 2:
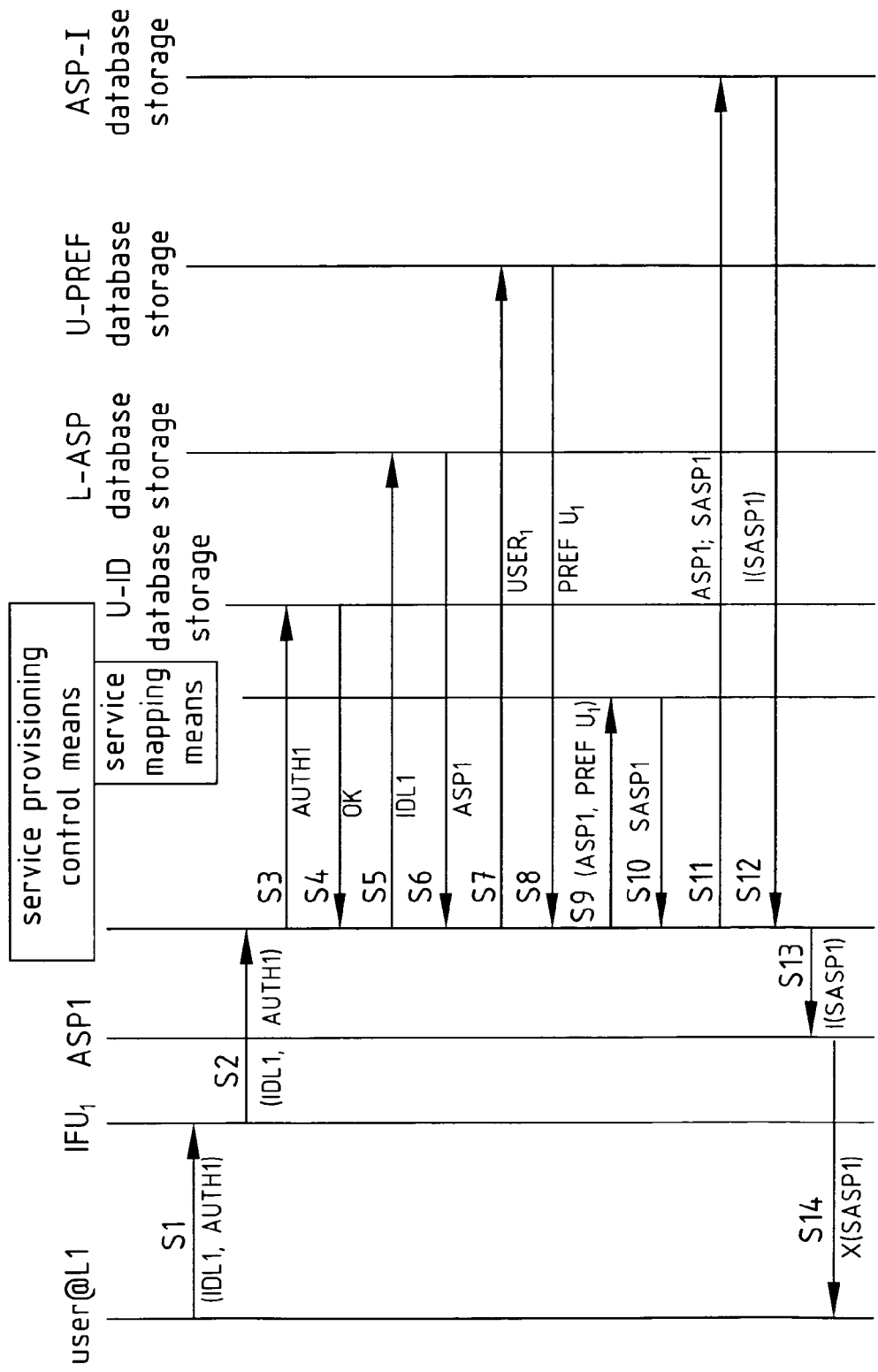
In FIG. 2 an example of a call-flow according embodiments of the present invention is provided.

In FIG. 1 an example of a system and method according to aspects of the present invention is illustrated. A possible corresponding call flow is depicted in FIG. 2. A user is located in a first location L1 of a set of disparate physical locations (L1, L2, L3, ... ) (for instance a hotel room or a home living room). In each of the disparate locations an interface means is provided for receiving inputs (IFL1, IFL2, IFL3, ... ), e.g. commands or other information (e.g. IDL1: identification information from location $L_1$, AUTH1: user authentication information) from the user (S1), and for forwarding this information to a service provisioning control means (or apparatus) (S2). This information may be, or may be not, converted to another data format in the respective interface means, before being forwarded to the service provisioning control means. The information may be, or may be not, converted into at least one message before being forwarded over a network connection between the interface means and for instance a server on which the service provisioning control means is implemented. The interface means of the hotel room corresponding to IFL1 may receive information from the user by means of state of the art interfacing tools, for instance but not only by means of a keyboard, mouse or typical TV remote control. Preferably, the user interfaces with the interface means IFL1 by means of speech/voice, which can be received for instance by any type of a microphone (for example but not limited to, stand alone or embedded in any other device). The signal generated by the microphone can then be converted into appropriate formats of data or voice signals and/or data messages for being forwarded. For instance, the interface unit IFL1 may perform voice recognition and/or voice to text mapping before forwarding corresponding suitably adapted messages to the service provisioning control means, comprising the user's identification information or commands. The user identification information is received by the service provisioning controlling means. The SPCM exchanges messages (S3, S4) with a database comprised in a storage means (U-ID) which links user identification information ($ID_i$) with respective users ($User_i$). Based on the identification of the user, the service provisioning control means then contacts a storage means comprising a database in which preference information (Pref $U_i$) is linked with respective users ($user_i$) and thereby retrieves user preference information (S7, S8). Note that in general, the use of user preference information is not necessary, although preferred. Also, the service provisioning control means preferably receives location information, which can be indirectly but originating from the user (input by the user into the interface means IFL1), directly originating from the interface means IFL1 or by other means. Other means may comprise for instance by interacting with an independent mobile communication network system or GPS system, and by retrieving location information associated to the user in these systems. Based on the location information, the service provisioning control means then exchanges information with a storage means comprising a database in which location information is linked with available service pack information (ASP1, ASP2, ASP3, ... ) for respective locations. Optionally, when the location information is not directly indicating one of the locations L1, L2, L3, ..., a further database comprised in a further data storage means may be consulted which links location information with identification information of a specific local service delivery system corresponding to L1, L2, L3, before performing the steps (S5, S6). At this moment, the service provisioning control means is aware of the local service delivery system L1 for the user, as well as the available service pack ASP1 for the corresponding local service delivery system, as well as of the user preferences. Based on this information, the service provisioning control means (or a service mapping means for instance comprised in the service provisioning control means) can select all or a a subset of services (SASP1) of the available service pack information corresponding to the local service delivery system of the user, based on the user preference information and the sets of priority rules. The service mapping may be a function internal or external to the SPCM, and the service control means can exchange messages with said service mapping means in order to provide the service mapping means with the appropriate information (S9,S10). In order to control the local service delivery system, the service provisioning control means contacts a storage means comprising a database linking the available service pack information with instructions I(SASP1) corresponding to the services of the available service pack (S11, S12). These instructions I(SASP1) may be used by the service provisioning control means to instruct the local service delivery system in order to provide the services according to the services or subset of services of the available service pack information, thereby providing the services (X(SAPS1) which are most probably relevant to the user (S14).

The local service delivery system comprises a display and/or sound system, and the service can comprise the displaying and/or making available through audio of information relevant to the user.

In a first example, a user can for instance enter the room and identify himself by telling is name or pronouncing identification information, possibly after detecting the presence of a person in the room, for instance by the interface means. By means of speakers, preferably belonging to the local service delivery system, the user can be asked to identify himself. Please note that in typical scenarios the user can use a pseudonym for this purpose. A microphone typically associated with the interface means receives the identification information, and sends it, over a communication network to the service provisioning control means. Based on the identification information, preference information is retrieved by the SPCM indicating that the user likes music of a certain artist. The SPCM also retrieves what is the available service pack for the local service delivery system and checks whether speakers/sound interface towards the user are available. If it is possible, the SPCM then instructs the Local service delivery system to play music of the respective artist in the room. In another example, when the interface means also receives commands from the user, e.g. "play song X of music group Y", these commands are forwarded to the SPCM, which will then check whether this can be provided to the user by means of checking the available service pack information. If it is possible, the SPCM can then instruct the local service delivery system to play that song, for instance at a volume or bass/treble setting preferred to the user.

In another example, a service which can be provided according to systems and methods of the present invention can for instance comprise displaying the information relevant to the user by the display system as a menu level of an on-screen-display menu of the local service delivery system by instructing the local service delivery system to navigate to the respective menu level. For instance a user identifies himself as described in any of the other examples and the SPCM receives location information for the user, for instance from the interface means of the local service delivery system of the location where the user resides. The SPCM retrieves preference information for the user, which can for instance indicate that the user is interested in music. By retrieving instruction information the SPCM can then instruct the local service delivery system to automatically display on the TV screen of the hotel room, a music submenu of the local service delivery system, instead of presenting a general menu in which the user has to find its way towards the music submenu.

In still another example, the service can comprise displaying the information relevant to the user by the display system as an on-screen list, the on-screen list illustrating services available to the user and being arranged according to the user preference information and the set of priority rules. After a similar flow as for the previous examples, the SPCM retrieves the required information in order to be able to instruct the local service delivery system to provide a service to the user.

This information can comprise command information from the user. Based in this information and a set of priority rules the SPCM generates a list of services which may be expected to be of interest to the user, and instruct the local service delivery system to display the list. It should be understood that the local service delivery system should of course be enabled to display a corresponding list to the user. Whether this is possible can be checked by the SPCM by consulting the respective available service pack information.

It will be appreciated to the skilled person that the remote controlling of the local service delivery system by a centralized, remote service provisioning control means which can automatically present or perform services which are according to the user preferences at whatever location out of a set of disparate locations and based on information which is remotely stored and which comprises available service pack information for the different disparate locations, user preferences and a set of priority rules, optionally further based on user's commands, will allow a user to more efficiently and comfortably interact with the available services made possible by the local delivery system.

The above description refers to "storage means" and "further storage means" in which respective information is stored in the form of databases, and from which this information can be retrieved. It will be appreciated by the skilled person that any combination of these databases in a single database is also possible and that also a single or a few storage means can comprise the respective database(s).

While some embodiments described herein include some but not other features included in other embodiments, combinations of features of different embodiments are meant to be within the scope of the invention, and form different embodiments, as would be understood by the skilled person.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be of any type, e.g., digital memories, magnetic storage media such as a magnetic disks and magnetic tapes, hard drives, or optically readable digital data storage media. The embodiments are also intended to cover computers programmed to perform the steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. The functions of the various elements shown in the FIGS., including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for controlling provisioning of a service to a user, the method comprising:
   identifying a user to whom at least one service of an available service pack is to be provided by a certain local service delivery system of a set of local service delivery systems based at least in part on user identification information by receiving an identification message that includes the user identification information and by communicating with a data storage apparatus configured to store a database which links user identification information with respective users, wherein the set of local service delivery systems are associated with a corresponding set of disparate physical locations;

receiving messages that include user location information identifying a certain location of the user;

identifying said certain local service delivery system from the set of local service delivery systems based at least in part on the certain location of the user and the set of disparate locations for the set of local service delivery systems by communicating with the data storage apparatus, wherein the data storage apparatus is configured to store a database which links physical location information with respective local service delivery systems;

retrieving available service pack information corresponding to said certain local service delivery system by communicating with the data storage apparatus, wherein the data storage apparatus is configured to store a database which links available service pack information with respective local service delivery systems, said available service pack information including information about a set of possible services which can be delivered to said user by said certain local service delivery system;

selecting a subset of services from the set of possible services based at least in part on said available service pack information and a set of priority rules for interaction between the user and the set of possible services available from the certain local service delivery system;

retrieving instruction information for at least one service of the subset of services by communicating with the data storage apparatus, wherein the data storage apparatus is configured to store a database which links instruction information with respective local service delivery systems, the retrieved instruction information including information required to control the certain local service delivery system to perform the at least one service; and instructing the certain local service delivery system to perform the at least one service of the subset of services based at least in part on the corresponding instruction information by communicating with the certain local service delivery system, wherein the certain local service delivery system thereby provides the at least one service to the user, based on the instruction information.

2. The method according to claim 1, further comprising
retrieving user preference information for said user by communicating with the data storage apparatus, wherein the data storage apparatus is configured to store a database which links user preference information with respective users;
providing services to said user based on at least said user preference information; and
selecting the subset of services from the set of possible services further based on said user preference information.

3. The method according to claim 1, further comprising
receiving messages that include user commands; and
selecting the subset of services from the set of possible services further based on said user commands.

4. The method according to claim 1, wherein said certain local service delivery system includes at least one of a display and a sound system;
wherein providing said at least one service includes one or more of displaying information to said user and making information available through audio to said user.

5. The method according to claim 4, wherein said at least one service includes displaying said information to said user by said display system as a menu level of an on-screen-display menu of said local service delivery system by instructing said certain local service delivery system to navigate to said respective menu level.

6. The method according to claim 4, wherein said at least one service includes displaying said information to said user by said display system as an on-screen list, said on-screen list illustrating services available to said user and being arranged according to said set of priority rules.

7. The method according to claim 4, wherein said at least one service includes making the information available through audio to said user by said sound system as a spoken list, said spoken list presenting services available to said user and being arranged according to said set of priority rules.

8. The method according to claim 7, wherein said spoken list is arranged further based on user preference information.

9. A system for controlling provisioning of a service to a user, comprising:
a service provisioning control apparatus including at least one processor and a memory device;
wherein the service provisioning control apparatus is configured to identify a user to whom at least one service of an available service pack is to be provided by a certain local service delivery system of a set of local service delivery systems based at least in part on user identification information, wherein the set of local service delivery systems are associated with a corresponding set of disparate physical locations;
wherein the service provisioning control apparatus is configured to receive or retrieve user location information identifying a certain location of said user;
wherein the service provisioning control apparatus is configured to identify said certain local service delivery system from the set of local service delivery systems based at least in part on the certain location of the user and the set of disparate locations for the set of local service delivery systems;
wherein the service provisioning control apparatus is configured to retrieve available service pack information corresponding to said certain local service delivery system, said available service pack information including information about a set of possible services which can be delivered to said user by said certain local service delivery system;
wherein the service provisioning control apparatus is configured to select a subset of services from the set of possible services based at least in part on said available service pack information and a set of priority rules for interaction between the user and the set of possible services available from the certain local service delivery system;
wherein the service provisioning control apparatus is configured to retrieve instruction information for at least one service of the subset of services, the retrieved instruction information including information required to control the certain local service delivery system to perform the at least one service;
wherein the service provisioning control apparatus is configured to instruct the certain local service delivery system to perform the at least one service of the subset of services based at least in part on the corresponding instruction information, wherein the certain local service delivery system thereby provides the at least one service to the user.

10. The system according to claim 9, wherein said apparatus is configured to retrieve user preference information for said user, configured to provide services to said user at least based on said user preference information, and configured to select the subset of services from the set of possible services further based on said user preference information.

11. The system according to claim 9, wherein the apparatus is configured to select the subset of services from the set of possible services further based on user commands received from a user interface unit corresponding to the physical location of said user.

12. A system for controlling provisioning of a service to a user, the system comprising:
a service provisioning control apparatus configured to identify a user to whom at least one service of an available service pack is to be provided by a certain local service delivery system of a set of local service delivery systems based at least in part on user identification information, wherein the set of local service delivery systems are associated with a corresponding set of disparate physical locations, wherein the service provisioning control apparatus is also configured to receive or retrieve location information identifying a certain location of the user, to identify the certain local service delivery system from the set of local service delivery systems based at least in part on the certain location of the user and the set of disparate locations for the set of local service delivery systems, to retrieve available service pack information corresponding to the certain local service delivery system, the available service pack information including information about a set of possible services which can be delivered to the user by the certain local service delivery system, to select a subset of services from the set of possible services based at least in part on the available service pack information and a set of priority rules for interaction between the user and the set of possible services available from the certain local service delivery system, to retrieve instruction information for at least one service of the subset of services, the retrieved instruction information including information required to control the certain local service delivery system to perform the at least one service, and to instruct the certain local service delivery system to perform the at least one service of the subset of services based at least in part on the corresponding instruction information; and
a data storage apparatus configured to store a database which links instruction information with respective local service delivery systems corresponding to the set of disparate locations and respective available service pack information with the respective local service delivery systems, said available service pack information including information about the set of possible services which can be delivered to the user by said respective local service delivery system.

13. A The system according to claim 9, further comprising:
a data storage apparatus configured to store a database which links instruction information with respective local service delivery systems corresponding to the set of disparate locations, said instruction information including information required by the service provisioning control apparatus to control the respective local service delivery systems to provide services to users.

14. The method according to claim 6, wherein the on-screen list is arranged further based on user preference information.

15. The system according to claim 9, wherein the certain local service delivery system includes at least one of a display and a sound system;
wherein the certain local service delivery system is configured to provide the at least one service by one or more of displaying information to the user and making information available through audio to the user.

16. The system according to claim 15, wherein the at least one service includes displaying the information to the user by the display system as a menu level of an on-screen-display menu of the local service delivery system by instructing the certain local service delivery system to navigate to the respective menu level.

17. The system according to claim 15, wherein the at least one service includes displaying the information to the user by the display system as an on-screen list, the on-screen list illustrating services available to the user and being arranged according to the set of priority rules.

18. The system according to claim 17, wherein the on-screen list is arranged further based on user preference information.

19. The system according to claim 15, wherein the at least one service includes making the information available through audio to the user by the sound system as a spoken list, the spoken list presenting services available to the user and being arranged according to the set of priority rules.

20. The system according to claim 19, wherein the spoken list is arranged further based on user preference information.

* * * * *